US006863062B2

(12) United States Patent
Denys

(10) Patent No.: US 6,863,062 B2
(45) Date of Patent: Mar. 8, 2005

(54) MASONRY CUTTER

(75) Inventor: Leo Edmund Denys, Paincourt (CA)

(73) Assignee: Sidewalks Plus Inc., Paincourt (CA)

( * ) Notice: Subject to any disclaimer, the term of this patent is extended or adjusted under 35 U.S.C. 154(b) by 0 days.

(21) Appl. No.: 10/405,643

(22) Filed: Apr. 3, 2003

(65) Prior Publication Data

US 2004/0007226 A1 Jan. 15, 2004

Related U.S. Application Data

(60) Provisional application No. 60/395,638, filed on Jul. 15, 2002.

(51) Int. Cl.[7] .............................................. B28D 1/04
(52) U.S. Cl. ..................................... 125/13.01; 125/14
(58) Field of Search ........................... 451/434; 125/38, 125/13.01, 14; 404/85, 86, 93, 94

(56) References Cited

U.S. PATENT DOCUMENTS

| | | | | |
|---|---|---|---|---|
| 3,284,961 A | * | 11/1966 | Graves | 451/359 |
| 3,340,863 A | * | 9/1967 | Zuzelo | 125/14 |
| 3,487,614 A | * | 1/1970 | Uhor | 56/233 |
| 3,550,701 A | * | 12/1970 | Holley | 175/122 |
| 3,559,350 A | * | 2/1971 | Bentley | 451/438 |
| 3,649,071 A | | 3/1972 | Graff | |
| 4,313,780 A | * | 2/1982 | Ford, Jr. | 156/523 |
| 4,433,871 A | | 2/1984 | Bertrand | |
| 4,832,412 A | * | 5/1989 | Bertrand | 299/39.3 |
| 4,962,913 A | | 10/1990 | Stewart | |
| 5,044,696 A | | 9/1991 | Blackhurst | |
| 5,540,210 A | * | 7/1996 | Jones | 125/13.01 |
| 5,669,371 A | * | 9/1997 | Rupprecht et al. | 125/13.01 |
| 5,676,125 A | | 10/1997 | Kelly et al. | |
| 6,050,744 A | * | 4/2000 | Binning | 404/108 |

* cited by examiner

Primary Examiner—M. Rachuba
(74) Attorney, Agent, or Firm—Anissimoff and Associates; Robert A. H. Brunet

(57) ABSTRACT

A masonry cutter comprising a tripod having legs for straddling the masonry to be cut and a cutting assembly mounted between the legs. The cutting assembly comprises a cutting element, preferably a circular saw, and a means for operating the cutting element. The legs may be vertically adjustable. Adjustment of the legs permits changing the angle between a plane parallel to the cutting element and a plane parallel with the masonry to be cut. The tripod may be mounted to a frame by means of a pivot with a vertical pivot axis passing through the pivot. This allows the tripod legs to be positioned and the cutting assembly to be oriented so that the first and second axes are in a desired direction with reference to the masonry to be cut. In one embodiment, the masonry to be cut is a sidewalk slab and the apparatus is used to remove trip hazards from the sidewalk slab. The masonry cutter may be removably mounted to a vehicle.

11 Claims, 4 Drawing Sheets

_US 6,863,062 B2_

MASONRY CUTTER

CROSS REFERENCE TO RELATED APPLICATIONS

This application claims the benefit of U.S. provisional patent application No. 60/395,638, filed Jul. 15, 2002.

FIELD OF THE INVENTION

The invention relates to the cutting of masonry. More particularly, the invention relates to the cutting of a sidewalk slab having a raised edge to thereby remove the trip hazard presented by the raised edge.

BACKGROUND

Masonry cutters are used to cut different types of masonry, for example, stone, cement, and concrete, such as concrete slabs and concrete blocks. Concrete is used in a variety of applications, for example, foundations, walls, pads, roads, curbstones, and in concrete slabs, such as are used to form sidewalks.

Sidewalks generally comprise a series of adjacent concrete slabs abutted along one edge. Adjacent slabs are generally aligned to present a level travelling surface to users of the sidewalk, such as pedestrians. Over time, adjacent sidewalk slabs may settle unevenly or may become raised by, for example, expansion and contraction of the underlying soil due to frost. When the abutting edge of a slab becomes raised as compared with an adjacent slab, it presents a trip hazard for users of the sidewalk. Although the definition of a trip hazard is somewhat subjective, it is generally considered that a raised edge of 1.5 cm or more presents a trip hazard to pedestrians. In addition to the safety risk to sidewalk users, sidewalk owners face liability from persons injured due to a fall and pay increased insurance premiums as a result. It is therefore desirable to eliminate trip hazards from sidewalks.

One way of removing trip hazards is to use a sidewalk lifter as disclosed in U.S. Pat. No. 4,962,913, issued Oct. 16, 1990. The sidewalk lifter comprises a rigid frame with cross members reaching over the sides of the section of sidewalk to be lifted. Winches on the cross members raise hooks attached to the section of sidewalk, thereby lifting it so that dirt may be added beneath the raised section. This apparatus is cumbersome to use and it is time consuming and labour intensive to repair sidewalks in this manner. Also, if there are pre-existing cracks in the sidewalk section, lifting the sidewalk section may exacerbate the cracks and potentially break the sidewalk section being lifted, which necessitates its replacement and could result in injury to workers.

Machines for cutting concrete are cumbersome, expensive and not particularly well adapted to the removal of trip hazards from sidewalks. U.S. Pat. No. 4,433,871, issued Feb. 28, 1984 shows a vehicle having two parallel booms with a bridge structure perpendicularly mounted thereto. The bridge structure has a rotary cutting saw carrier movably mounted thereon and four jacks, one at each corner of the bridge structure, that are deployed to stabilize the bridge structure while cutting. It is difficult to adjust the height of each jack independently without causing wobbling of the bridge structure due to uneven placement of the four jacks. This in turn makes it difficult to straddle a sidewalk slab with the bridge structure and difficult to adjust the saw to a desired cut angle. A cut can be made at an angle to the horizontal plane or to the vertical plane, but not at an angle to both planes at the same time, which further complicates adjusting the saw to the desired cut angle. This concrete cutter is impractical for removing trip hazards from sidewalks.

Another machine for cutting concrete is disclosed in U.S. Pat. No. 5,676,125, issued Oct. 14, 1997. A concrete saw is mounted at the end of an excavator boom. Although the saw can be maneuvered in many directions, the saw does not have the benefit of legs for straddling a sidewalk slab to thereby stabilize the saw, and accordingly cannot be used for precisely removing a raised portion of the sidewalk slab in a controlled fashion.

Having regard to the foregoing, there still exists a need for an improved masonry cutter.

SUMMARY OF THE INVENTION

According to an aspect of the invention, there is provided a masonry cutter comprising: a tripod having three legs for straddling masonry to be cut; and, a cutting assembly mounted to the tripod between the legs, the cutting assembly comprising a cutting element and a means for operating the cutting element, the cutting assembly movable along a first axis and along a second axis perpendicular to the first axis to thereby move the cutting element through the masonry.

According to another aspect of the invention, there is provided a vehicle for cutting masonry comprising: a masonry cutter comprising a tripod having three legs for straddling masonry to be cut, and, a cutting assembly mounted to the tripod between the legs, the cutting assembly comprising a cutting element and a means for operating the cutting element, the cutting assembly movable along a first axis and along a second axis perpendicular to the first axis to thereby move the cutting element through the masonry; wherein the masonry cutter is removably mounted to the vehicle.

According to yet another aspect of the invention, there is provided a method of cutting masonry comprising: providing a masonry cutter comprising a tripod having three vertically adjustable legs for straddling masonry to be cut, and, a cutting assembly mounted to the tripod between the legs, the cutting assembly comprising a cutting element and a means for operating the cutting element, the cutting assembly movable along a first axis and along a second axis perpendicular to the first axis to thereby move the cutting element through the masonry, the first axis and the second axis lying in a plane parallel with the cutting element; positioning the legs to straddle the masonry to be cut; vertically adjusting the legs so that the plane parallel with the cutting element adopts a pre-determined angular orientation with respect to a plane parallel to the masonry to be cut; moving the cutting element along the first axis into engagement with the masonry to be cut; moving the cutting element along the second axis through the masonry to be cut, thereby forming a cut portion of masonry; and, removing the cut portion of masonry.

In one embodiment, the present invention is directed to the removal of trip hazards from sidewalks caused by uneven sidewalk slabs. A masonry cutter according to the invention comprises a tripod having three legs. The legs are preferably vertical and are vertically adjustable. The tripod has a cutting assembly attached between the legs that is selectively movable along a first axis and along a second axis perpendicular thereto; the axes generally correspond to the longitudinal and lateral directions respectively with reference to the sidewalk. The cutting assembly includes a cutting element for removing a raised edge from a sidewalk slab and a means to operate the cutting element. The cutting element is preferably a circular saw and the means to operate the cutting element is preferably a motor for causing rotation of the cutting element. The masonry cutter is preferably removably mounted to a vehicle, such as a tractor, for ease of transportation, setup, and use. The vehicle is capable of raising and lowering the masonry cutter and of moving it from place to place.

The tripod is preferably pivotally mounted to the underside of a frame by means of a pivot and is rotatable about a generally vertical pivot axis passing through the pivot. The cutting assembly generally rotates with the tripod. The legs are positioned straddling the sidewalk slab in a substantially horizontal plane above the masonry, and the tripod and cutting assembly are rotated about the vertical pivot axis to position the first and second axes in the desired direction of cut. The masonry cutter may then be lowered or the legs may be extended so that the legs engage the ground and support the tripod. Preferably, the legs are oriented such that one leg is placed on the slab to be cut and two legs are placed on the adjacent slab in alignment with the raised edge. The legs may then be vertically adjusted in order to change the desired angle of cut between the cutting element and the sidewalk slab. Movement of the saw along the first and second axes may be accomplished by, for example, adjustable cranks.

In another embodiment, the legs need not be vertical or vertically adjustable. The cutting assembly may be mounted on gimbals and may be angled with respect to the tripod without vertically adjusting the legs. The cutting assembly may similarly rotate about a vertical pivot axis with reference to the tripod. This allows the tripod to be positioned straddling the masonry to be cut with the legs in any desired position and the cutting assembly to be independently adjusted to any desired direction of cut and/or angle of cut. The first and second axes need not lie in a plane parallel with the cutting element and need not be perpendicular with the vertical pivot axis. The cutting element may be of any suitable type, for example a reciprocating saw or a grinding element.

Further features of the invention will be described or will become apparent in the course of the following detailed description.

BRIEF DESCRIPTION OF THE DRAWINGS

In order that the invention may be more clearly understood, preferred embodiments thereof will now be described in detail by way of example, with reference to the accompanying drawings, in which.

DETAILED DESCRIPTION

Figure 1:
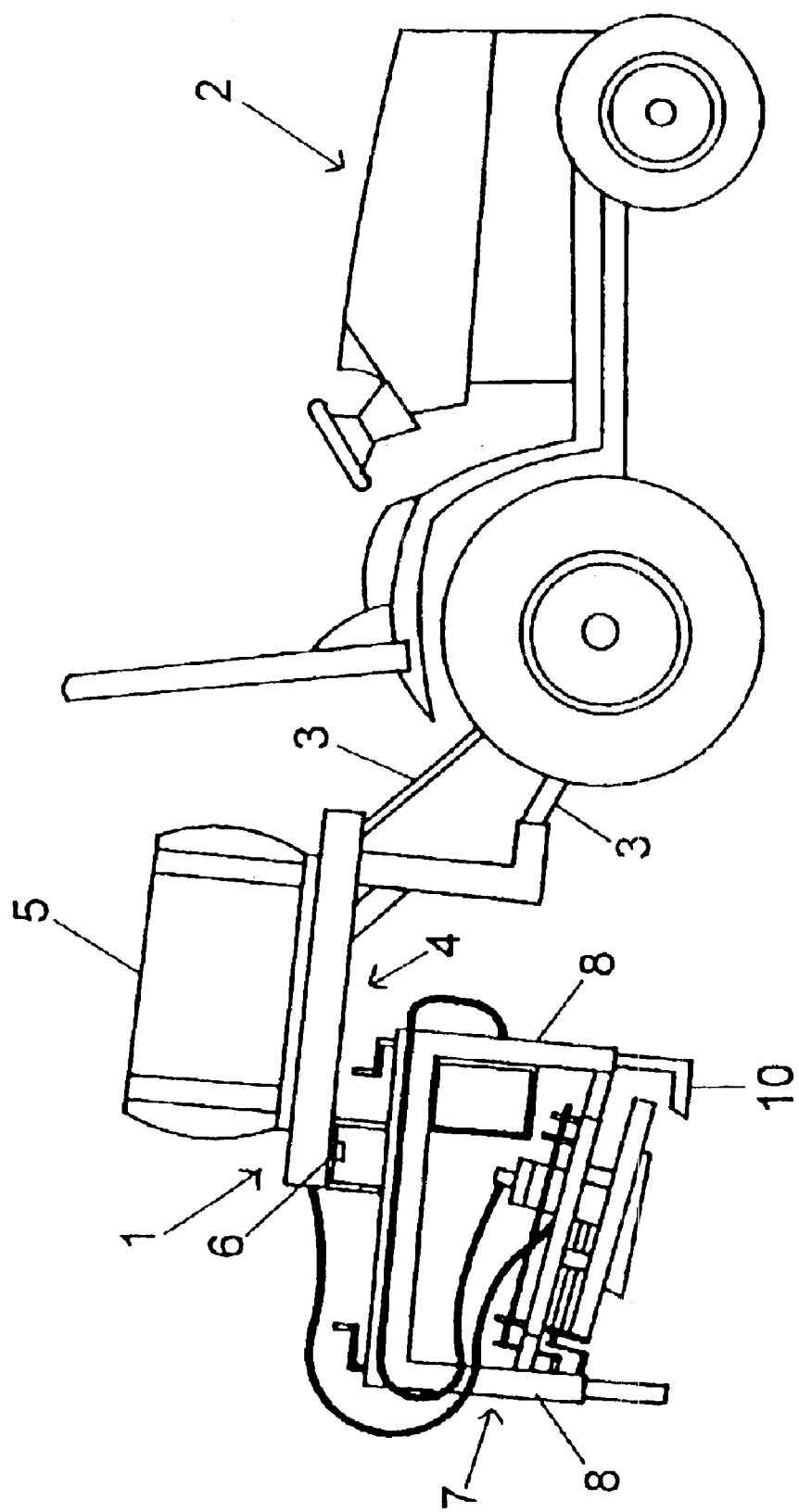
FIG. 1 is a side view of a masonry cutter removably mounted to a vehicle.
Figure 2:
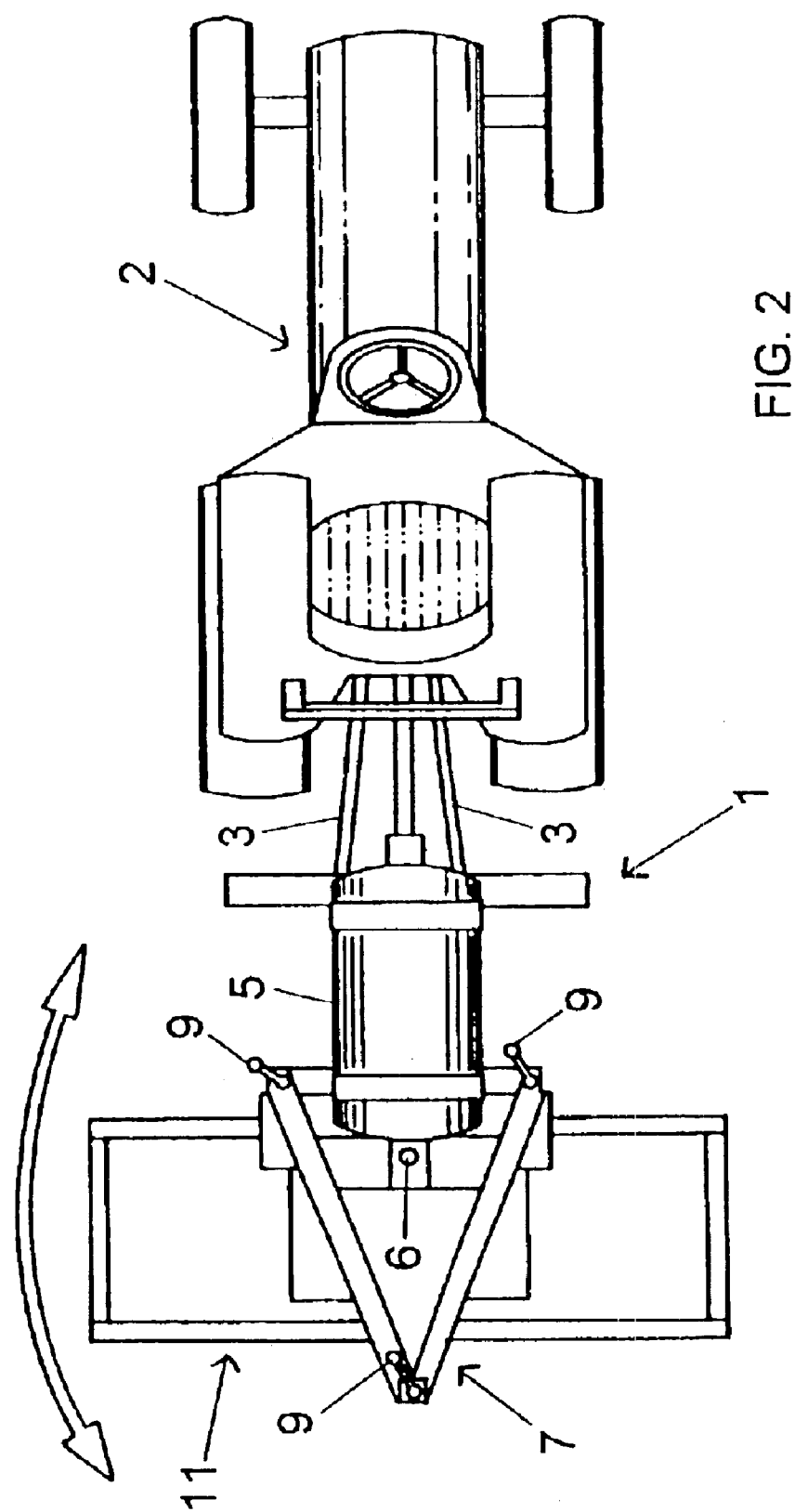
FIG. 2 is a top view of the masonry cutter and vehicle of FIG. 1.

With reference to FIGS. 1 and 2, an embodiment of a masonry cutter according to the present invention is shown with a frame 1 removably mounted to the rear of a vehicle 2, such as a tractor. The frame 1 is attached to the vehicle 2 using connecting links 3, permitting the masonry cutter to be raised for transport and lowered into a desired position for use. The vehicle 2 is preferably used as a source of power for the masonry cutter; for example, the vehicle shown includes a hydraulic pump (not shown) that may be connected to the masonry cutter by suitable fluid conduits to cause hydraulic fluid powered movement of various components.

The frame 1 includes a horizontal platform 4 extending rearwardly along the length of the masonry cutter upon which may be mounted a fluid reservoir 5. The distal end of the platform 4 includes a pivot 6 attached to the underside thereof that permits rotation of a tripod 7 in a horizontal plane about a vertical pivot axis passing through the pivot. The platform 4 therefore serves the dual function of supporting the fluid reservoir 5 and as a means of placing the pivot 6 far enough away from the vehicle 1 to permit the tripod 7 to rotate completely around beneath the platform without contacting the vehicle or any other part of the masonry cutter. The rotation of the tripod 7 about the vertical pivot axis is illustrated in FIG. 2.

Still referring to FIGS. 1 & 2, the tripod 7 has three legs 8 that may each be vertically adjusted, for example, by means of a screw (not shown) connected to a manual crank 9 or adjusted by any other suitable mechanism. Independent adjustment of the legs 8 permits a range of angles of the first and second axes with reference to the masonry. In other words, the angular orientation of a plane parallel with the cutting element may be changed with reference to a plane parallel to the masonry to be cut by vertically adjusting the legs 8. The use of three legs 8 reduces the likelihood of the apparatus wobbling on uneven surfaces and simplifies the creation of the desired cut angle. Typically, a single leg 8 is placed on the slab to be cut and a pair of legs 8 placed on the adjacent slab. The pair of legs 8 includes guide feet 10 that may be placed adjacent the raised edge of the slab as an aid in aligning the apparatus with the slab when pivoting the tripod 7.

Figure 3:
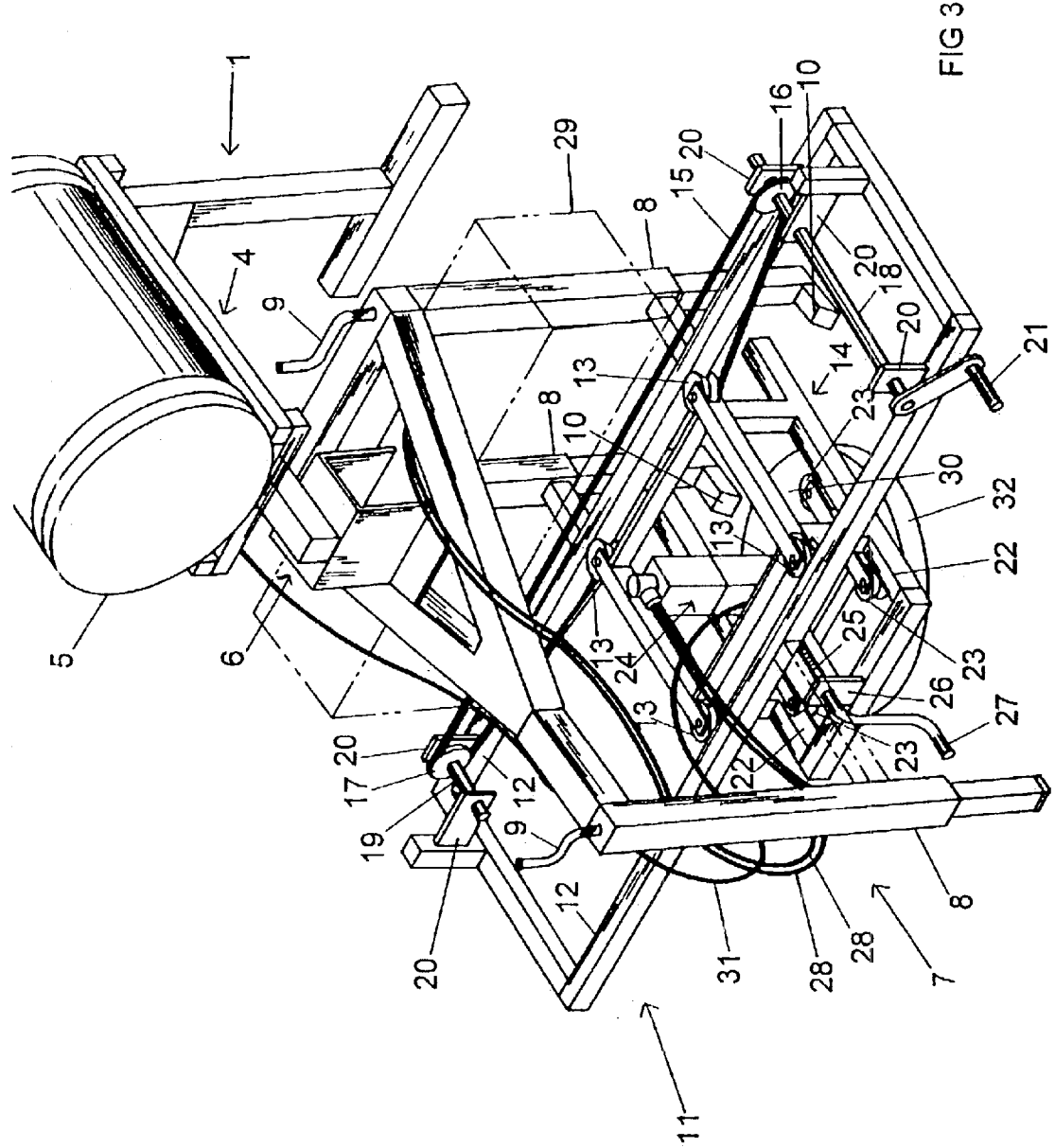
FIG. 3 is a perspective view of the masonry cutter.
Figure 4:
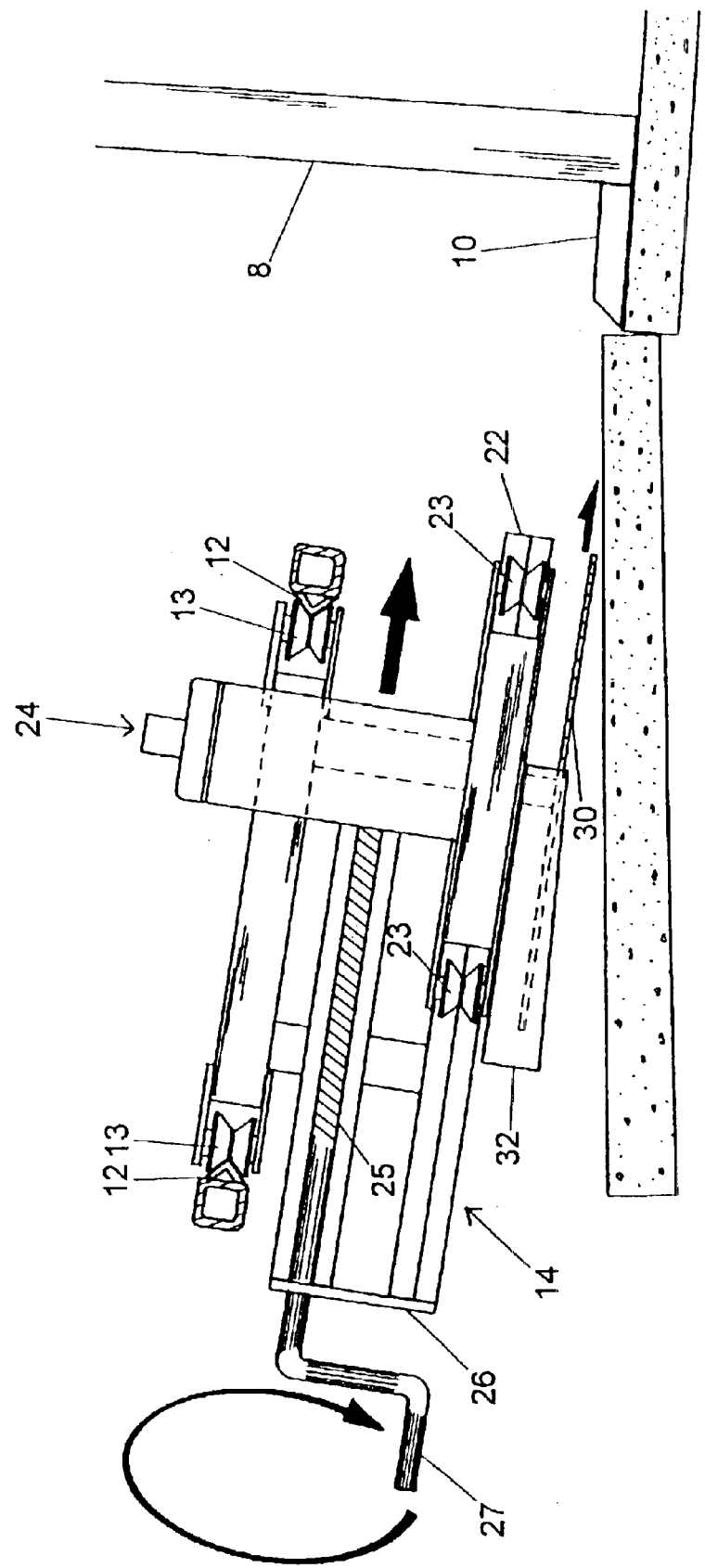
FIG. 4 is a partial side view of the cutting apparatus positioned for use in cutting a sidewalk slab.

With reference to FIG. 3, a carriage 11 is attached to the underside of the tripod 7 between the legs 8. The carriage 11 comprises a first set of rails 12 with a corresponding first set of wheels 13. The wheels 13 permit movement of sub-carriage 14 along the second axis by means of the rails 12 in response to movement of drive cable 15, which is attached to the sub-carriage. Drive cable 15 passes over drive pulley 16 and idler pulley 17, which are radialy aligned with one another and mounted on opposite sides of carriage 11 to drive shaft 18 and idler shaft 19, respectively. The shafts 18, 19 are each attached to the carriage 11 using shaft journals 20 in a manner permitting rotation of the shafts about parallel axes. Drive shaft 18 may be rotated either clockwise or counter-clockwise by means of drive crank 21, causing co-rotation of drive pulley 16, drive cable 15, idler pulley 17, idler shaft 19 and further causing sub-carriage 14 to move in a corresponding direction. Those skilled in the art will appreciate that the drive mechanism described is but one possible means to cause movement of sub-carriage 14 and that such movement may also be accomplished by any other suitable means, for example a fluid powered system.

Sub-carriage 14 includes a second set of rails 22 with a corresponding second set of wheels 23, both in a plane parallel to and below that of carriage 11. The wheels 23 permit movement of cutting assembly 24 along the first axis by means of the rails 22 in response to movement of screw 25. The screw is rotationally attached to the sub-carriage 14 by screw journal 26 and includes an externally threaded portion which passes through a corresponding internally threaded portion (not shown) attached to the cutting assembly 24. Rotational movement of the screw 25, provided for example by screw crank 27, causes movement of cutting assembly 24 along the axis of the screw.

In the embodiment shown, cutting assembly 24 includes a hydraulic motor which is in fluid communication by means of hydraulic lines 28 with a hydraulic pump powered by the vehicle 2. Power distribution center 29 may be provided to contain certain components of the fluid power system (not shown), such as valves, fittings, and the like. The hydraulic motor is used to cause rotational movement of cutting element 30. The cutting assembly 24 also includes a nozzle (not shown) in fluid communication by means of coolant line 31 with the reservoir 5 for spraying a cooling fluid on the cutting element 30 to aid in making the cut and to prolong the life of the cutting element. A guard 32 is provided over a portion of the cutting element 30 to protect operators of the apparatus from accidental contact with the cutting element or exposure to ejected debris.

Referring to FIGS. 1 to 4, the method of operation of the invention can be described by way of example with reference to the removal of trip hazards from sidewalks. The tripod 7 is rotated about the vertical pivot axis so that the first and second axes are aligned in any desired direction with respect to the slab to be cut. This direction is not necessarily aligned with the longitudinal or lateral directions as defined with reference to the length and width of the sidewalk, respectively. The first and second axes lie in a plane parallel with the cutting element. A desired angle of cut defined between the plane parallel with the cutting element and the plane of the masonry to be cut is selected by vertical adjustment of the legs 8. It is preferable to make a cut which creates a relatively smooth transition from one slab to the next, removing the trip hazard. Since the slabs may be unevenly shifted across their width, it may be necessary to select an angle of cut that does not lie in either a horizontal plane or a longitudinally aligned vertical plane, but in both planes simultaneously. The angle of cut may be between 0° and 60°, preferably between 0° and 30°, more preferably between 0° and 10°, still more preferably between 0° and 5°.

Once the angle has been selected, rotation of cutting element 30 is initiated and cooling fluid may be supplied. Screw 25 is rotated using screw crank 27 to advance the cutting assembly 24 along the first axis towards the slab being cut. Upon sufficient engagement of the cutting element 26 with the slab, preferably such that a complete cut is made through the slab, drive crank 21 is rotated to cause movement of cutting assembly 24 along the second axis, generally across the width of the slab. In this manner, a substantially wedge shaped piece of the slab may be removed, creating the desirably smooth transition between slabs. After the cut is complete, the apparatus may be lifted and transported by the vehicle 2 to the site of the next trip hazard. A typical trip hazard may simply and effectively be removed in one to two minutes using the present invention, which represents a significant improvement in speed as compared with prior art methods.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features and sub-combinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A masonry cutter comprising:
    a) a frame;
    b) a tripod having three legs for straddling masonry to be cut, the tripod attached to the underside of the frame by a pivot and rotatable about a vertical pivot axis passing through the pivot; and,
    c) a cutting assembly mounted to the tripod between the legs, the cutting assembly comprising a cutting element and a means for operating the cutting element, the cutting assembly movable along a first axis and along a second axis perpendicular to the first axis to thereby move the cutting element through the masonry.

2. A masonry cutter according to claim 1, wherein the cutting assembly rotates with the tripod about the vertical pivot axis.

3. A masonry cutter according to claim 2, wherein rotation of the tripod about the vertical pivot axle changes the direction of the first axis and the second axis with respect to the masonry to be cut.

4. A masonry cutter according to claim 1, wherein the first axis and the second axis lie in a plane parallel with the cutting element.

5. A masonry cutter according to claim 1, wherein the first axis and the second axis are perpendicular to the vertical pivot axis.

6. A masonry cutter according to claim 1, wherein each leg is vertical and vertically adjustable.

7. A masonry cutter according to claim 6, wherein the first axis and the second axis lie in a plane parallel with the cutting element.

8. A masonry cutter according to claim 7, wherein vertical adjustment of the legs changes the angular orientation of the plane parallel with the cutting element with respect to a plane parallel to the masonry to be cut.

9. A masonry cutter according to claim 8, wherein the angle between the plane parallel with the cutting element and the plane parallel with the masonry to be cut is between 0 and 60 degrees.

10. A masonry cutter according to claim 8, wherein the angle between the plane parallel with the cutting element and the plane parallel with the masonry to be cut is between 0 and 10 degrees.

11. A masonry cutter according to claim 1, wherein the cutting element is circular and the means for operating the cutting element causes rotation of the cutting element.

* * * * *